(12) United States Patent
Hou

(10) Patent No.: US 10,416,541 B2
(45) Date of Patent: Sep. 17, 2019

(54) PHOTO-CURING 3D PRINTING DEVICE AND IMAGING SYSTEM THEREOF

(71) Applicant: PRISMLAB CHINA LTD., Shanghai (CN)

(72) Inventor: Feng Hou, Shanghai (CN)

(73) Assignee: PRISMLAB CHINA LTD., Shanghai (CN)

(*) Notice: Subject to any disclaimer, the term of this patent is extended or adjusted under 35 U.S.C. 154(b) by 547 days.

(21) Appl. No.: 15/101,853

(22) PCT Filed: Oct. 16, 2014

(86) PCT No.: PCT/CN2014/088723
§ 371 (c)(1),
(2) Date: Jun. 3, 2016

(87) PCT Pub. No.: WO2015/081756
PCT Pub. Date: Jun. 11, 2015

(65) Prior Publication Data
US 2016/0306266 A1  Oct. 20, 2016

(30) Foreign Application Priority Data
Dec. 3, 2013 (CN) .......................... 2013 1 0642109

(51) Int. Cl.
*G03B 21/14* (2006.01)
*B33Y 50/02* (2015.01)
(Continued)

(52) U.S. Cl.
CPC .......... *G03B 21/142* (2013.01); *B29C 64/129* (2017.08); *B29C 64/20* (2017.08);
(Continued)

(58) Field of Classification Search
CPC .. G03B 21/142; G03B 27/522; G03B 21/006; B29C 64/126; B29C 64/386;
(Continued)

(56) References Cited

U.S. PATENT DOCUMENTS 5,772,301 A * 6/1998 Kwon .................. H04N 9/3102
348/E9.027
6,190,015 B1 * 2/2001 Tsai ...................... G03B 21/006
353/101
(Continued)

FOREIGN PATENT DOCUMENTS

CN     101027602 A     8/2007
CN     101332649 A    12/2008
(Continued)

OTHER PUBLICATIONS

Sato et al, 35.4: Novel Transreflective LCD with Micro-lens array to Double the Brightness, pp. 1274-1277, year 2007. (Year: 2007).*
(Continued)

*Primary Examiner* — Nahida Sultana
(74) *Attorney, Agent, or Firm* — Kilpatrick Townsend & Stockton LLP

(57) ABSTRACT

The present invention provides an imaging system of a photo-curing 3D printing device. The imaging system comprises a light source, a liquid crystal panel, a first polarized light filter, a second polarized light filter, a focusing lens array, a projection lens, and a controller. The imaging system is characterized in that the focusing lens array is disposed on a light incoming side of the liquid crystal panel; each focusing lens of the focusing lens array is corresponding to each pixel of the liquid crystal panel; each focusing lens can gather light beams irradiating to the corresponding pixels, so that the light beams penetrate a light transmission region of the pixels as much as possible. A deflection lens is arranged on a light outgoing side of the liquid crystal panel; the
(Continued)

deflection lens can deflect around at least one rotation axis perpendicular to an optical axis of the imaging system, so as to finely tune positions of images of the light beams projected to the surface of a light-sensitive material. The controller commands the light source to expose for multiple times and commands the deflecting lens to deflect in exposure each time, so as to project the images of the light beams exposed each time to different positions of the surface of the light-sensitive material.

12 Claims, 7 Drawing Sheets

(51) Int. Cl.
    *B33Y 30/00* (2015.01)
    *B33Y 10/00* (2015.01)
    *G03B 21/00* (2006.01)
    *G03B 27/52* (2006.01)
    *B29C 64/129* (2017.01)
    *B29C 64/20* (2017.01)
    *B29C 64/386* (2017.01)

(52) U.S. Cl.
    CPC ............ *B29C 64/386* (2017.08); *B33Y 10/00* (2014.12); *B33Y 30/00* (2014.12); *B33Y 50/02* (2014.12); *G03B 21/006* (2013.01); *G03B 27/522* (2013.01)

(58) Field of Classification Search
    CPC ....... B29C 64/20; B33Y 50/02; B33Y 21/006; B33Y 30/00; B33Y 10/00
    See application file for complete search history.

(56) References Cited

U.S. PATENT DOCUMENTS

| | | | |
|---|---|---|---|
| 7,790,093 B2* | 9/2010 | Shkolnik | G03F 7/2022 264/401 |
| 8,025,409 B2* | 9/2011 | Kawamura | H04N 9/3105 349/8 |
| 2015/0201172 A1* | 7/2015 | Tomikawa | F21V 9/06 349/5 |
| 2016/0231644 A1* | 8/2016 | Daiku | G02B 27/0025 |
| 2017/0210071 A1* | 7/2017 | Wu | B33Y 50/02 |
| 2018/0036941 A1* | 2/2018 | Xu | B29C 67/00 |
| 2018/0126646 A1* | 5/2018 | Zitelli | B29C 64/255 |
| 2018/0141268 A1* | 5/2018 | Holt | B29C 64/129 |
| 2018/0272598 A1* | 9/2018 | Cox | B33Y 10/00 |

FOREIGN PATENT DOCUMENTS

| | | | | |
|---|---|---|---|---|
| JP | 2001252986 A | * | 9/2001 | ............ B29C 64/00 |
| JP | 2001252986 A | | 9/2001 | |

OTHER PUBLICATIONS

CN201410699256.6, "Search Report", dated Jun. 2, 2017, 1 page.
LCD Screen Selective Transmission Principle 3D Printer Imaging System. [online]. SINA Corporation, May 11, 2013. Retrieved from the Internet: <URL: http://blog.sina.com.cn/solarfireb>, 5 pages.
PCT/CN2014/088723, "PCT International Search Report."
PCT/CN2014/088723, "PCT International Written Opinion.".

* cited by examiner

PHOTO-CURING 3D PRINTING DEVICE AND IMAGING SYSTEM THEREOF

CROSS-REFERENCE TO RELATED APPLICATIONS

The present application is the U.S. national stage of PCT/CN2014/088723, filed Oct. 16, 2014, which claims benefit of priority to Chinese Patent Application No. 201310642109.0, filed Dec. 3, 2013, both of which are incorporated by reference herein in their entirety.

TECHNICAL FIELD

The present invention relates to a photo-curing 3D printing device, and especially to an imaging system of a photo-curing 3D printing device.

BACKGROUND ART 3D printing technology is blue-printed by a computer three-dimensional design model to stack and bond special materials, such as metal powder, ceramic powder, plastic and cell tissue in a layer-wise manner, by means of a laser beam, a hot-melt nozzle etc. via software layered discretization and a numerical control molding system so as to finally mold same by superimposition to manufacture an entity product. Different from the traditional manufacturing industry of shaping and cutting raw materials by means of machining, such as mould and turn milling, so as to finally produce a product, 3D printing turns a three-dimensional entity into several two-dimensional planes for production by processing and superimposing the materials layer by layer, thereby greatly reducing the complexity of manufacturing. This digital manufacturing mode can directly produce any shape of parts from computer graphic data without needing a complicated process, a large machine tool and massive manpower, so that production-manufacturing can extend to a broader range of production crowds.

At present, molding manners of 3D printing technology are still evolving, and materials used are also varied. In various molding manners, a photo-curing method is a relatively mature manner. The photo-curing method uses the principle that photosensitive resin is cured after being irradiated by an ultraviolet laser to perform material molding by accumulation, and has the characteristics, such as high molding precision, good surface finish and high material utilization.

FIG. 1 shows a basic structure of a photo-curing 3D printing device. The 3D printing device 100 comprises a material tank 110 for accommodating photosensitive resin, an imaging system 120 for curing the photosensitive resin and a lifting platform 130 for connecting a molding tool. The imaging system 120 is located above the material tank 110, and can irradiate a light beam image to enable a layer of photosensitive resin at the liquid level of the material tank 110 to be cured. After the imaging system 120 irradiates the light beam image to enable a layer of photosensitive resin to be cured each time, the lifting platform 130 will drive the layer of molded photosensitive resin to slightly drop, and enable the photosensitive resin to be uniformly spread on a top surface of the cured tool via a blade 131 to wait for the next irradiation. The cycle repeats, and a three-dimensional tool molded by accumulation layer by layer will be obtained.

The imaging system 120 often commonly uses a laser molding technique or a digital light procession (DLP) projection technique.

The laser molding technique means using a laser scanning device to scan spot by spot. However, due to the property of the photosensitive resin, the laser power cannot be too great, otherwise, the resin will be damaged. Therefore, the moving speed of the laser is limited to a few meters to ten meters per second, causing a too slow molding speed.

The DLP projection imaging technique is realized by using a digital micromirror device (DMD) to control the reflection of light. The digital micromirror device can be considered as a mirror surface. This mirror is composed of hundreds of thousands even to billions of micromirrors. Each micromirror represents a pixel, and an image is constituted by these pixels. Each micromirror can be independently controlled to decide whether light rays are reflected to a projection lens. Finally, the whole mirror reflects the required light beam image. Due to the limitation of the resolution of a DMD chip, a defect of a relatively small molding dimension of the DLP projection imaging technique is caused, and there is a bottleneck.

A liquid crystal projection technique, as an area array image source, can theoretically project a light beam image similar to that of the DLP projection imaging technique, so as to be used for constructing the imaging system of the photo-curing 3D printing device. A liquid crystal panel contains many pixels, and each pixel can separately control a polarization direction of polarized light, and can control whether light rays of a certain pixel pass in cooperation with polarized light filters at two sides of the liquid crystal panel, and therefore, a light beam passing through a liquid crystal panel system is imaged. However, there is an obvious disadvantage for the liquid crystal panel to be used in the photo-curing 3D printing device. The reason is that the wavelength of a light source required for curing the photosensitive resin is generally below 430 nm; and light rays within the range of this wavelength may cause damage to liquid crystals in the liquid crystal panel, and the service life of the liquid crystals will be shortened. Furthermore, low transmittance of the liquid crystal panel will cause the panel endurance to be further shortened.

It is well known that a liquid crystal panel has a black mask region with a certain non-light transmitting area around each pixel for covering a control circuit of the pixel (comprising a thin film transistor, wiring, etc.). This part of mask region will reduce the light transmitting capability of an LCD panel, so as to influence the brightness and contrast of the imaging system. The ratio that the area of light transmitting regions (i.e. regions that are not covered by a mask) accounts for the total pixel area is called aperture ratio. It is assumed that the aperture ratio of the liquid crystal panel is 60%, which means that up to 40% of the area cannot transmit light and this is a great loss of the brightness of light. Meanwhile, after theses light rays are absorbed by the liquid crystal panel, excessive temperature rise in liquid crystals will be caused, thereby resulting in the ageing of and damage to the liquid crystal panel.

One way of improving the above-mentioned problems is to improve the aperture ratio as far as possible. This is admittedly helpful for reducing light loss; however, the improvement of the aperture ratio has an ultimate limit in technology, depending on a more advanced manufacturing process of a liquid crystal panel. Therefore, in the photo-curing 3D printing device, one way of making up for the shortage of transmittance is using a light source with higher brightness. However, in the case where the photo-curing 3D printing device needs relatively strong projection brightness, blindly improving the brightness of light rays that pass the liquid crystal panel exacerbates the shortening of the service life of the liquid crystals.

Table 1 below shows the comparison of service life after liquid crystals receive strong enough irradiation of light with various wavelengths in the liquid crystal projection technique.

TABLE 1

| Light wavelength (nm) | Endurance |
| --- | --- |
| 410 | 0.4 |
| 433 | 1.0 |
| 470 | 4.2 |

It can be seen from Table 1 that by taking the service life of the light wavelength at 433 nm as reference 1, when the wavelength is reduced to 410 nm, the service life is significantly reduced to 0.4. In striking contrast thereto, when the wavelength is at 470 nm, the service life is significantly increased to 4.2.

Due to the above-mentioned defects in service life, no photo-curing 3D printing device applying a liquid crystal system has occurred at present.

SUMMARY OF THE INVENTION

The object of the present invention is to provide a photo-curing 3D printing device and an imaging system thereof, which is based on a liquid crystal system and can project a light beam image required for photo-curing under an acceptably relatively-low light power.

The present invention provides an imaging system of a photo-curing 3D printing device, comprising a light source, a liquid crystal panel, a first polarized light filter, a second polarized light filter, a focusing lens array, a projection lens, a deflecting lens and a controller. The light source emits a light beam. The liquid crystal panel is located on a light-emitting light path of the light source, and the liquid crystal panel contains a plurality of pixels. The first polarized light filter is provided on an incident light side of the liquid crystal panel, and the second polarized light filter is provided on an emergent light side of the liquid crystal panel, wherein the first polarized light filter and the second polarized light filter cooperate with the liquid crystal panel to shield a part of the light beam so as to form a light beam image. The focusing lens array is provided on the incident light side of the liquid crystal panel, wherein each focusing lens of the focusing lens array corresponds to each pixel of the liquid crystal panel, and each focusing lens can converge a light beam irradiated to a corresponding pixel, so that the light beam penetrates a light-transmitting region of the pixel as much as possible and is imaged on the emergent light side of the liquid crystal panel, and the dimension of an image corresponds to the dimension of the light-transmitting region of the pixel. The projection lens is disposed between the liquid crystal panel and a photosensitive material surface, and is located between the image and the photosensitive material surface, wherein the projection lens projects the light beam image onto the photosensitive material surface, so that the light source passes through the images formed by various projection lenses to form a plurality of light spots on the photosensitive material surface. The deflecting lens is disposed on the emergent light side of the liquid crystal panel, wherein the deflecting lens can deflect around at least one rotation axis perpendicular to an optical axis of the imaging system, so as to finely tune the position of the light beam image projected onto the photosensitive material surface. The controller commands the light source to perform multiple exposures, and commands the deflecting lens to deflect during each exposure, so that light beam images during various exposures are projected to different positions of the photosensitive material surface.

In an embodiment of the present invention, the focusing lens array covers the liquid crystal panel.

In an embodiment of the present invention, various light spots, of the light beam images during various exposures, formed on the photosensitive material surface are substantially not overlapped with one another.

In an embodiment of the present invention, the light spots formed by the light beam images during various exposures cover the photosensitive material surface.

In an embodiment of the present invention, the dimension of the image is less than, equal to or slightly greater than half of a pixel dimension of the liquid crystal panel.

In an embodiment of the present invention, the light beam images during various exposures contain the same image information.

In an embodiment of the present invention, the light beam images during various exposures contain different image information.

In an embodiment of the present invention, the ratio of the dimension of the image to the pixel dimension of the liquid crystal panel is approximately 1:2, 1:3 or 1:4, and meanwhile, the number of exposures of the light source is four, nine or sixteen.

In an embodiment of the present invention, by setting the distance between the light source and the focusing lens to be L1, the distance of the focusing lens to an imaging plane to be L2, a front focal length and a back focal length of the focusing lens respectively to be f and f', the dimension of the light source to be A, and the dimension of the image to be d, the following conditions are satisfied:

$$f'/L2 + f/L1 = 1; \text{ and}$$

$$L1/L2 = A/d.$$

In an embodiment of the present invention, the wavelength of the light beam is below 430 nm.

The present invention further proposes an imaging system of a photo-curing 3D printing device, comprising a light source, a liquid crystal panel, a first polarized light filter, a second polarized light filter, a focusing lens array, a projection lens, a micro-displacement drive mechanism and a controller. The light source emits a light beam. The liquid crystal panel is located on a light-emitting light path of the light source, and the liquid crystal panel contains a plurality of pixels. The first polarized light filter is provided on an incident light side of the liquid crystal panel. The second polarized light filter is provided on an emergent light side of the liquid crystal panel, wherein the first polarized light filter and the second polarized light filter cooperate with the liquid crystal panel to shield a part of the light beam so as to form a light beam image. The focusing lens array is provided on the incident light side of the liquid crystal panel, wherein each focusing lens of the focusing lens array corresponds to each pixel of the liquid crystal panel, and each focusing lens can converge a light beam irradiated to a corresponding pixel, so that the light beam penetrates a light-transmitting region of the pixel as much as possible and is imaged on the emergent light side of the liquid crystal panel, and the dimension of an image corresponds to the dimension of the light-transmitting region of the pixel. The projection lens is disposed between the liquid crystal panel and a photosensitive material surface, and is located between the image and the photosensitive material surface, wherein the projection lens projects the light beam image onto the photosensitive material surface, so that the light source passes through the images formed by various projection lenses to form a plurality of light spots on the photosensitive material surface. The micro-displacement drive mechanism is connected to the liquid crystal panel, and can drive the liquid crystal panel to move in a first direction and a second direction which are perpendicular to each other, so as to finely tune the position of the light beam image projected onto the photosensitive material surface. The controller commands the light source to perform multiple exposures, and commands the micro-displacement drive mechanism to act during each exposure, so that light beam images during various exposures are projected to different positions of the photosensitive material surface.

The present invention further proposes a photo-curing 3D printing device, comprising the imaging system mentioned above.

In the above-mentioned technical solution of the present invention, by providing a focusing lens array, light beams irritated onto a liquid crystal panel are converged to penetrate the light-transmitting regions of various pixels of the liquid crystal panel as much as possible, so that the shielding of a non-light transmitting portion of the liquid crystal panel is reduced until it is avoided. In addition, by means of the convergence of light beams, the brightness of light spots irritated onto a photosensitive material surface can be significantly improved. In the case where the total luminous flux of the liquid crystal panel is relatively small, a resin photosensitiveity threshold value can still be reached, a photosensitive relative linear section thereof is entered, and a curing speed is drastically improved.

BRIEF DESCRIPTION OF THE DRAWINGS

The features and performance of the present invention are further described by the following embodiments and the drawings thereof.

DETAILED DESCRIPTION

The embodiments of the present invention describe a photo-curing 3D printing device and an imaging system thereof, the imaging system using a liquid crystal panel as an area array image source. In order to prevent the service life of the liquid crystal panel from being significantly shortened, the embodiments of the present invention can project a light spot image satisfying the brightness required for photo-curing under an acceptably relatively-low light power.

Figure 1:
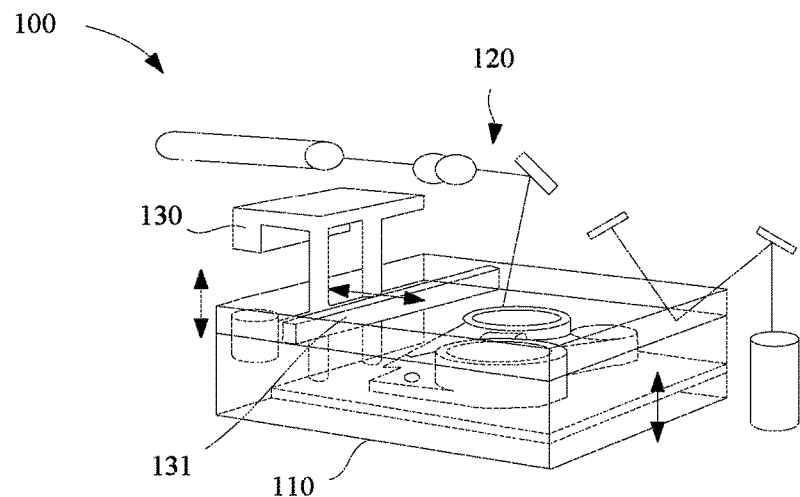
FIG. 1 shows a basic structure of a photo-curing 3D printing device.
Figure 2:
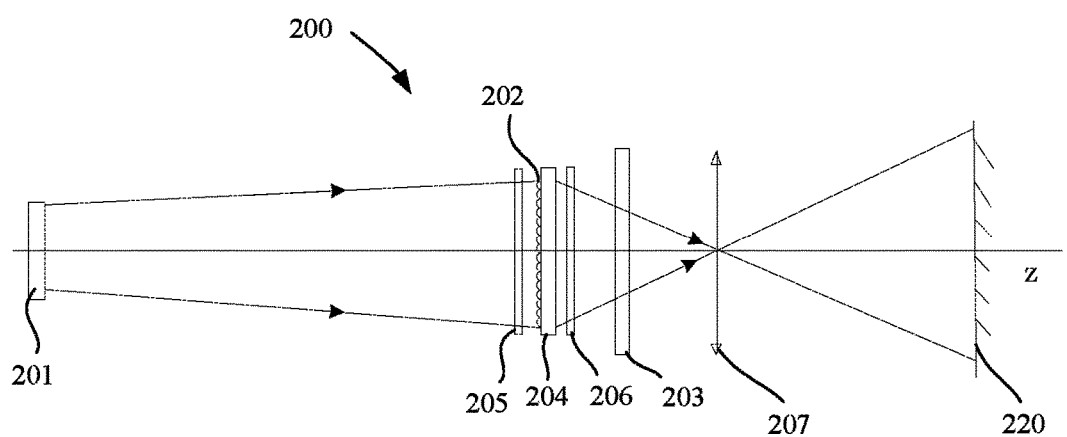
FIG. 2 shows an imaging system of a 3D printing device of an embodiment of the present invention.

FIG. 2 shows an imaging system of a 3D printing device of an embodiment of the present invention. With reference to FIG. 2, the imaging system 200 of this embodiment comprises a light source 201, a focusing lens array 202, a deflecting lens 203, a liquid crystal panel 204, a first polarized light filter 205, a second polarized light filter 206, a projection lens 207 and a controller (not shown in the figures). For the sake of simplicity, devices unrelated to the present invention are omitted.

The light source 201 can emit a light beam. The wavelength of the light emitted by the light source 201 is dependent on a photosensitive material molded by curing. For example, when UV resin is selected as the photosensitive material, a light beam can be violet light to ultraviolet light, and the wavelength thereof is below 430 nm, such as 400-405 nm.

The liquid crystal panel 204 is located on a light-emitting light path of the light source 201. The liquid crystal panel 204 contains a plurality of pixels, and the main function thereof is to deflect a polarization direction of the light beam emitted by the light source 201, and to be able to shield a part of the light emitted by the light source in cooperation with a polarized light filter, so as to form a light beam image. The first polarized light filter 205 and the second polarized light filter 206 are respectively provided on an incident light side and an emergent light side of the liquid crystal panel 204 to form a liquid crystal system. The first polarized light filter 205 and the second polarized light filter 206 only allow light with the same polarization direction as that thereof to pass, and the polarization directions of the two are perpendicular to each other. In the case where there is no liquid crystal panel 204, the first polarized light filter 205 and the second polarized light filter 206 will block all light rays that attempt to penetrate. However, since there is the liquid crystal panel 204 between the two polarized light filters, the liquid crystal panel 204 is separated into many liquid crystal cells full of liquid crystals, wherein each liquid cell corresponds to one pixel, and after passing through the first polarized light filter 205, the light rays can be deflected at a certain angle by liquid crystal molecules via the liquid crystal panel 204, and the deflection angle is controlled by a voltage applied to the liquid crystal panel, and these light rays can pass through the second polarized light filter 206 only when having the same component of the polarization direction as that of the second polarized light filter 206, therefore, individual arrangement directions of liquid crystal molecules controlling each liquid crystal cell can control the brightness and images of the light rays penetrating the liquid crystal system.

When used for 3D printing, the light beam image formed by the liquid crystal panel 204 can only contain grey scale information. Therefore, the liquid crystal panel 204 may not need any optical element, such as a colour filter, required when used as a display panel.

In the embodiments of the present invention, the first polarized light filter 205 can be a polarized plate or a polarized light-splitting prism. The second polarized light filter 206 can also be a polarized plate or a polarized light-splitting prism.

In terms of each pixel of the liquid crystal panel 204, since a thin film transistor, wiring, etc. need to be disposed near the liquid crystal cell, and not all the light beams can pass, in consideration of various light energy losses including the transmittance, the light source 201 can cure the photosensitive material only when reaching a certain irradiation power, or enable a curing time to be at an acceptable level, and as stated above, light with the wavelength below 430 nm may cause relatively huge damage to liquid crystals after reaching a certain power, how to reduce the irradiation power of the light source 201 as far as possible when the condition of curing the photosensitive material is satisfied becomes a key that the imaging system based on the liquid crystal panel can be implemented.

This embodiment introduces the focusing lens array 202 and cooperates with the control over the focusing level to achieve the aforementioned object.

Figure 3:
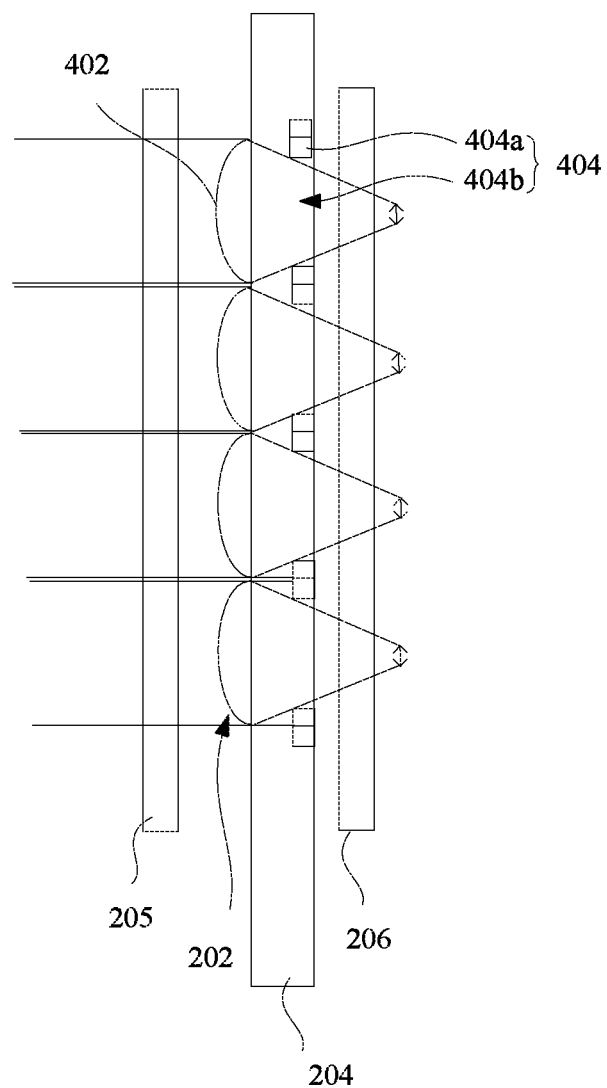
FIG. 3 shows a cooperative relationship between a focusing lens array and a liquid crystal display panel of an embodiment of the present invention.

The focusing lens array 202 is provided on the incident light side of the liquid crystal panel 204. The focusing lens array 202 contains many minor focusing lenses. Each focusing lens corresponds to each pixel of the liquid crystal panel 204. FIG. 3 shows a cooperative relationship between a focusing lens array and a liquid crystal panel of an embodiment of the present invention. In this embodiment, the focusing lens array 202 covers the liquid crystal panel 204. For example, a certain focusing lens 402 corresponds to a certain pixel 404 of the liquid crystal panel 204. This pixel 404 contains a non-light transmitting black mask 404a and a light transmitting region 404b. The focusing lens array 202 can be formed by pressing a resin material. By means of a focusing function of the focusing lens disposed on the incident light side of the liquid crystal panel, more light can penetrate the liquid crystal panel, and the brightness of a focus point at the emergent light side of the liquid crystal panel is improved. This design brings about two advantageous effects: first, the irradiation power of the light source 201 is not improved, and therefore the liquid crystal panel is protected from being irradiated by ultraviolet light with higher light intensity; and second, after convergence, the brightness of the focus point is doubled, and the focus point is finally imaged to the photosensitive material, so that the photosensitive material can be more easily cured. Here, the brightness of the focus point depends on the focusing level.

In this embodiment, the shape, the area, the divergence angle and the distance to the liquid crystal panel 204 of the light source 201 need to be designed strictly so as to obtain expected light spot brightness, as will be described in detail below.

Figure 4:
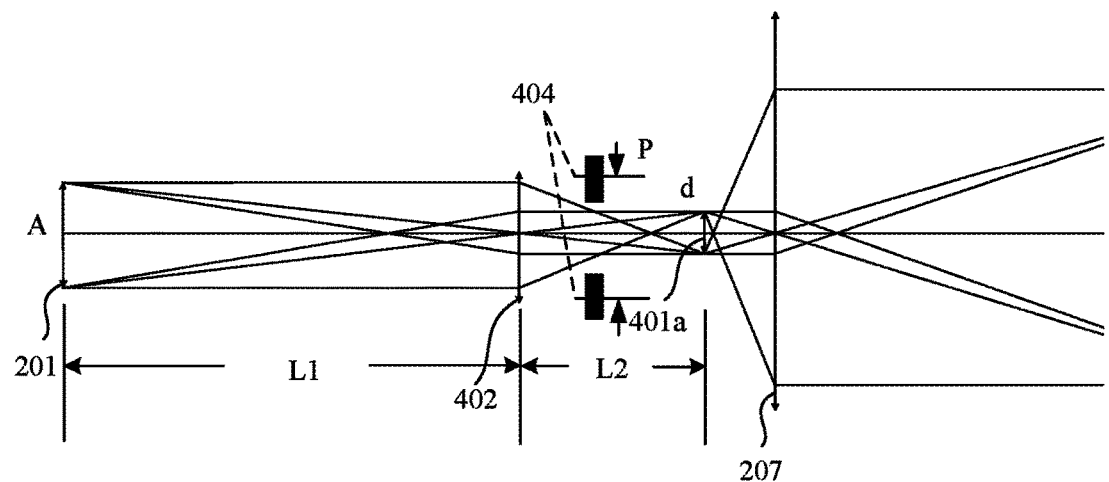
FIG. 4 shows a principle diagram of a light path of a single pixel of an imaging system shown in FIG. 2.

FIG. 4 shows a principle diagram of a light path of a single pixel of an imaging system shown in FIG. 2. With reference to FIG. 4, the light source 201 emits a light beam, and it is assumed that the height and width of a light-emitting surface thereof are both A, the divergence angle of the light source can cooperate with the area needing to be irradiated by the liquid crystal panel 204, and the distance of the light source 201 to the focusing lens array 202 is L1; and the light beam is irradiated to the focusing lens array 202, wherein some light rays are irradiated to a certain focusing lens 402 so as to correspond to a certain pixel 404 of the liquid crystal panel 204. The dimension of the pixel 404 is P.

The focusing lens 402 will converge light beams emitted by the light source 201, and meanwhile, an image 401a of the light source 201 will be generated at a back end of the focusing lens 402. The image 401a is projected on the photosensitive material surface (not shown in the figures) to form a light spot after passing through the projection lens 207.

By setting a front focal length of the focusing lens to be f, a back focal length thereof to be f' (f'≈f), an image height of the light source 201 to be d, and the distance of the focusing lens 402 to an imaging plane to be L2, we can obtain according to the Gauss formula:

$$f/L1+f'/L2=1; \text{ and}$$

$$L1/L2=A/d.$$

In an example, f=100 μm, P=20 μm, L1=200 mm and A=20 mm are substituted into the above-mentioned formulas, then:

$$100 \text{ μm}/200 \text{ mm}+100 \text{ μm}/L2=1; L2=100.05 \text{ μm};$$

$$200 \text{ mm}/100.05 \text{ μm}=20 \text{ mm}/d; \text{ and } d=10 \text{ μm}.$$

It can be seen from the above-mentioned calculation that the size of an imaging light spot can be controlled by means of an appropriate design. Here, the smaller the light spot is, which means that the higher the focusing level is, and then the higher the brightness of the focused light spot is.

By contrast, if the liquid crystal panel is used for projection displaying, the light spot can be bigger by designing as much as possible so as to be able to only pass the black mask, and thus the contrast is the highest, and the picture quality is the best. However, this design is not suitable for 3D printing.

In fact, due to a possible manufacturing defect of the focusing lens 402, particularly due to the existence of a diffraction effect of light, the light spot dimension is slightly greater than the dimension actually calculated, and the light spot may also become round in shape different from an original shape of the light source 201, and this requires to adjust the aforementioned parameters in an actual experiment so as to determine final data.

In any case, this convergence function has a variety of potential technical effects: first, the brightness of the converged light beams at a focus point is higher, for example, if the dimension is reduced to ½, then the brightness is increased to four times of the original brightness, which is favourable for photosensitivity of the photosensitive material, and will be described in an extensive manner below; second, the maximum penetration of the light beam reduces the heat generated by the light beam absorption of the liquid crystal panel, which is helpful for prolonging the service life of the liquid crystal panel; moreover, the light spot dimension of the converged light beams formed on the photosensitive material surface is relatively small, which is helpful for improving the printing resolution.

A description will be made below about how to give play to the above-mentioned potential technical effects.

The projection lens 207 is disposed between the liquid crystal panel 204 and the photosensitive material surface 220 of a 3D printing device, and a light beam image formed and emitted by the liquid crystal panel 204 and the polarized light filters 205, 206 is projected to the photosensitive material surface 220. Then with reference to FIG. 4, the light source 201 has a pixel 401a at the back of each pixel of the liquid crystal panel 204. The projection lens 207 is located between the image and the photosensitive material surface, as shown in FIG. 4. Therefore, a plurality of images formed by the light source 201 via the liquid crystal panel 204 will be clearly projected onto the photosensitive material surface 220. The ratio of the dimension of the converged image 401a to the pixel dimension of the liquid crystals can be 1:2, i.e. the ratio of the area is 1:4, which will enable the brightness to be correspondingly four times of the original brightness. Although the dimension of the image 401a can be enlarged via the projection, this ratio will keep unchanged when the image 401a is projected onto the photosensitive material surface. The ratio setting will continue to be discussed with reference to a light spot on the photosensitive material surface below.

Figure 5:
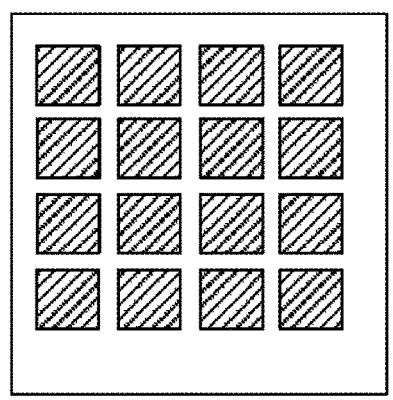
FIG. 5 shows a black mask on a liquid crystal panel.
Figure 6:
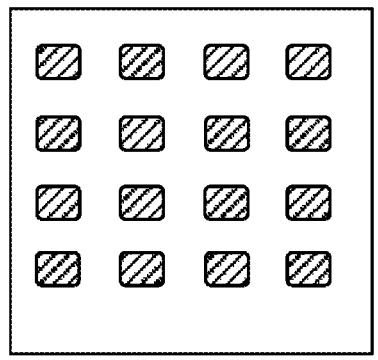
FIG. 6 shows an image formed by an imaging system by means of one exposure on a photosensitive material surface of an embodiment of the present invention.

FIG. 6 shows an image formed by an imaging system by means of one exposure on a photosensitive material surface of an embodiment of the present invention. As comparison, if light rays are directly imaged via a black mask of the imaging system show in FIG. 5, an image similar to the black mask will be obtained. It can be seen by comparing FIG. 5 with FIG. 6 that after being converged by the focusing lens array 202, the dimension of the light spot in the image is scaled down, while the brightness of the light spot is improved correspondingly. By means of the appropriate optical design as stated above, the convergence level is adjusted to decide a scale-down ratio of the dimension of the light spot. For example, the ratio of the dimension of the converged light spot (the dimension of the image 401a projected to the photosensitive material surface) to the pixel dimension (the dimension of the liquid crystals projected to the photosensitive material surface) can be 1:2, i.e. the ratio of the area is 1:4, and the brightness is correspondingly four times of the original brightness. Therefore, the total energy reaching the photosensitive material surface is not reduced.

It can be understood that in consideration of the aforementioned factors such as the manufacturing defect of the focusing lens 402 and the diffraction effect of light, when the designed ratio of the light spot dimension to the pixel dimension is 1:2, the actual ratio of the light spot dimension to the pixel dimension is slightly greater than 1:2. The imaging system of this embodiment allows for an appropriate error, i.e. the aforementioned dimension ratio is approximately 1:2.

In addition, the ratio of the dimension of the converged light spot to the pixel dimension can be approximately 1:3 or 1:4. The reason why an integer multiple is taken here is that in consideration of subsequent deflections, a new light spot needs to be inserted into a blank portion of each light spot.

As shown in FIG. 6, a blank is left between light spots in an image exposed once on the photosensitive material surface. For this purpose, these blanks are filled by multiple exposures, so that the light spots cover the entire surface of the photosensitive material.

Figure 7:
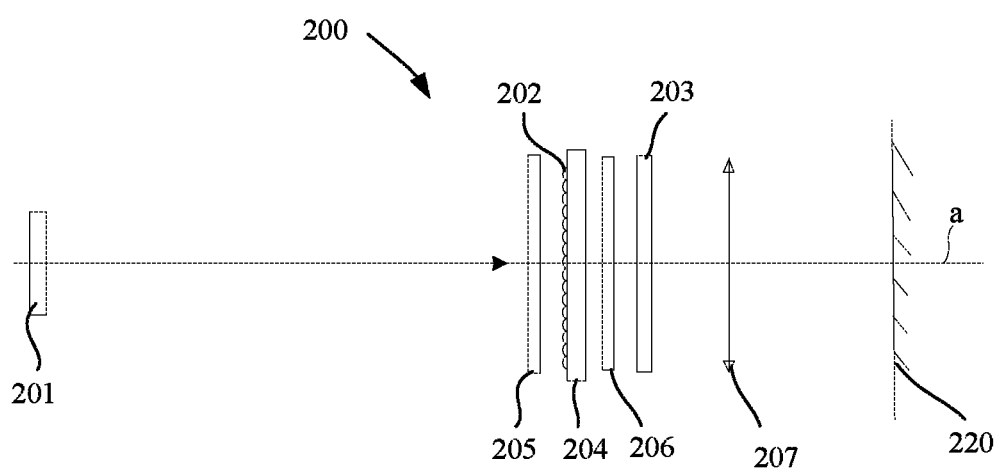
FIG. 7 shows a schematic diagram of light rays of an imaging system that are not deflected of an embodiment of the present invention.
Figure 8:
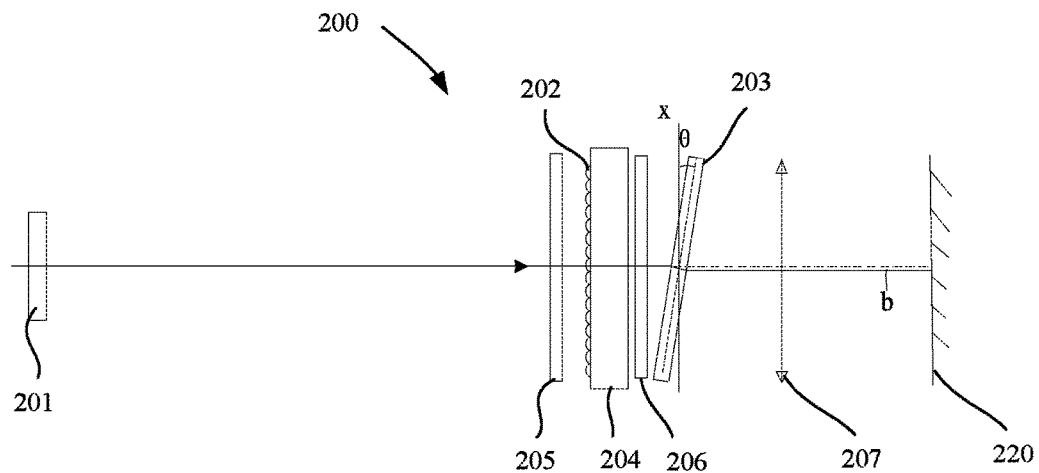
FIG. 8 shows a schematic diagram of light rays of an imaging system that have been deflected of an embodiment of the present invention.

In this embodiment, the deflecting lens 203 is disposed on an emergent light side of the liquid crystal panel 204, such as between the liquid crystal panel 204 and the projection lens 207 (or at the back of the projection lens 207). The deflecting lens 203 can deflect around at least one rotation axis so as to finely tune the position of the light beam image projected to the photosensitive material surface 220. The aforementioned rotation axes are all perpendicular to an optical axis z of the imaging system, and when the deflecting lens is parallel to (perpendicular to the optical axis z) the liquid crystal panel 204, light rays are vertically irradiated to the deflecting lens 203, and at this moment, no refraction phenomenon occurs, and light rays a directly pass through the deflecting lens (as shown in FIG. 7); and if the deflecting lens 203 tilts an angle around a rotation axis, the light rays will be refracted when entering the deflecting lens 203 from the air, the light rays will be refracted again when entering the air from the deflecting lens 203, and the refraction angles of two refractions are the same with the directions being opposite, refracted light rays b will move forward according to the original direction, but a minor displacement occurs (as shown in FIG. 8). For example, this rotation axis of the deflecting lens is a rotation axis x shown in FIG. 7. In addition, this rotation axis can be a rotation axis y which is located within a plane containing the rotation axis x and is perpendicular to the optical axis z, and is perpendicular to the rotation axis x (not shown in the figures). In the embodiments of the present invention, the deflecting lens 203 can not only deflect around the rotation axis x, but also can deflect around the rotation axis y.

Figure 10:
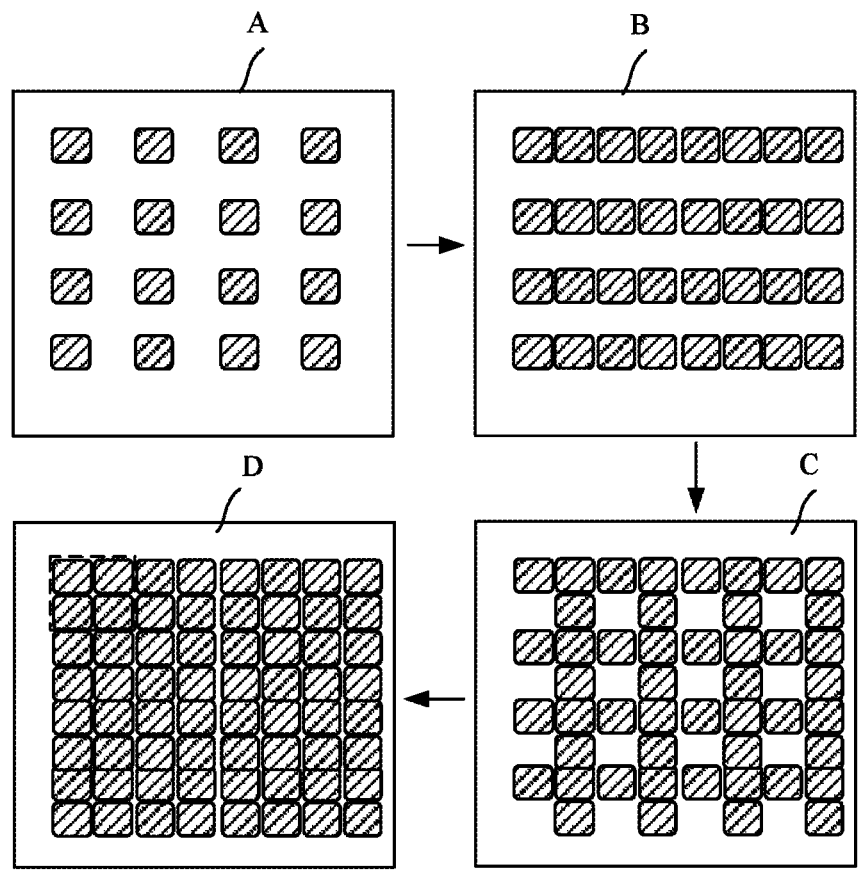
FIG. 10 shows images formed by an imaging system by means of 4 exposures on a photosensitive material surface of an embodiment of the present invention.

The above-mentioned deflecting can cause, in conjunction with multiple exposures, light beams images during various exposures to be superimposed, so that the light spots cover the photosensitive material surface 220. Specifically, the light source 201 can perform multiple exposures, and during each exposure, the deflecting lens 203 is commanded to deflect, so that light beam images during various exposures are projected to different positions of the photosensitive material surface. FIG. 10 shows images formed by an imaging system by means of 4 exposures on a photosensitive material surface of an embodiment of the present invention. With reference to FIG. 10, during the first exposure, a projection image A is formed; during the second exposure, since the deflecting lens 203 deflects around the x axis, so that a light beam image moves slightly in a horizontal direction in the drawing and is projected into a blank between two columns of light spots, a projection image B is formed; during the third exposure, the deflecting lens 203 deflects around the y axis, so that a light beam image moves slightly in a vertical direction in the drawing and is projected into a blank between two rows of light spots, a projection image C is formed; and similarly, a projection image D is formed. The projection image D covers the photosensitive material surface 220.

In the actual implementation, a controller of the imaging system 200 can be used to command the light source 201 to perform multiple exposures, and at the same time, to command the deflecting lens 203 to cooperatively perform x and y directions of deflection during each exposure.

Figure 9:
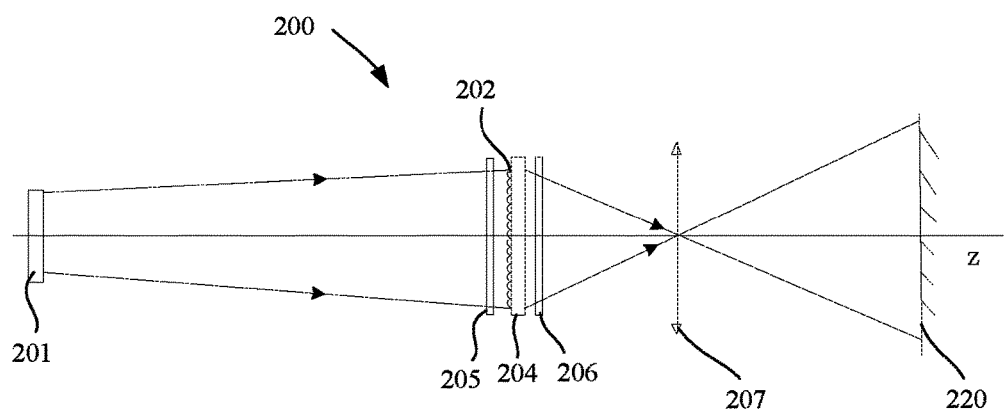
FIG. 9 shows an imaging system of a 3D printing device of another embodiment of the present invention.

In another embodiment of the present invention, as shown in FIG. 9, the liquid crystal panel 204 is connected to a micro-displacement drive mechanism 208 to replace the deflecting lens 203. The micro-displacement drive mechanism 208 can drive the liquid crystal panel to move in an x direction and a y direction, so as to finely tune the position of a light beam image projected to the photosensitive material surface 220. Here, the x and y directions are within the same plane, and this plane is perpendicular to the optical axis z of the imaging system. When the micro-displacement drive mechanism 208 does not drive the displacement of the liquid crystal panel, the light beam image of the liquid crystal panel 204 is in a first position of the photosensitive material surface 220. When the micro-displacement drive mechanism 208 drives the liquid crystal panel 204 to perform micro-displacement in one direction (x or y direction), a minor displacement will occur to the entire light beam image of the liquid crystal panel 204 with the liquid crystal panel 204.

The micro-displacement drive mechanism 208 can be piezoelectric ceramic.

It needs to be noted that although the superimposed light beam images during various exposures cover the photosensitive material surface, the positions of the light beam images during various exposures on the photosensitive material surface 220 can be substantially not overlapped with one another. This is realized by controlling the ratio of the pixel dimension to the dimension of the light spot to be an integer and the step of deflecting exactly being the light spot dimension. This substantially non-overlapped setting can avoid the light received by an overlapped region higher than the average level, causing non-uniform curing. It can be understood that in consideration of factors such as a diffraction effect of light, slight overlapping is helpful for making up for the missing of a non-rectangular edge portion of the light spot. Therefore, it is not required that the light spots are completely not overlapped. In addition, although the superimposed light beam images cover the photosensitive material surface, it can be understood that not each position in the light beam images is a light spot, but may has a dark spot.

In an embodiment of the present invention, the light beam images during various exposures can contain the same image information. By taking FIG. 10 as an example, in the projection image D, four light spots within a virtual box contain the same image information. The advantage of this embodiment lies in improving the brightness of the light spot that reaches the photosensitive material surface during each exposure.

In the above-mentioned example, four exposures are performed when the light spot dimension is controlled to be ½ of the pixel dimension. It can be understood that nine exposures are performed when the light spot dimension is controlled to be ⅓ of the pixel dimension, and sixteen exposures are performed when the light spot dimension is controlled to be ¼ of the pixel dimension, and so on.

Next, the principle that exposure brightness is favourable for the photosensitivity of the photosensitive material is described. After receiving a certain mount of light irradiation, the photosensitive material will be cured within a certain time, and this time is called curing time. The power of light irradiation, i.e. light irradiation energy received by the photosensitive material in unit time, will significantly influence the curing time. In theory, the energy required for curing a certain area of photosensitive material can be represented as:

$$W=P*t,$$

where P is light power irradiated onto resin, and t is exposure time.

Namely, the same energy can be represented by improving the light power but reducing the exposure time or reducing the light power but increasing the exposure time so as to achieve the same curing effect, and this is called "reciprocity law". However, a case of reciprocity law distortion exists in photosensitive resin.

Figure 11:
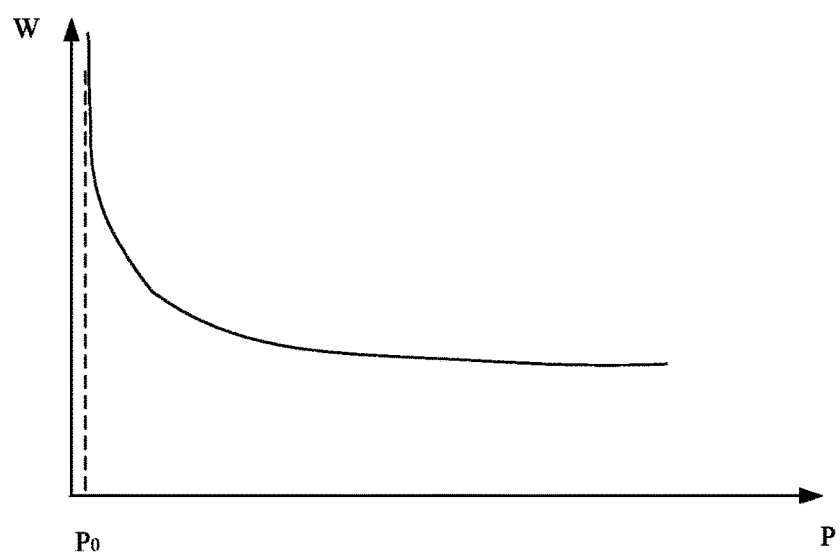
FIG. 11 shows a relationship curve between energy and lighting power required for curing photosensitive resin.

FIG. 11 shows a relationship curve between energy and lighting power required for curing photosensitive resin. As shown in FIG. 11, x axis represents lighting power, and y axis represents the energy W required for curing. The curve represents the energy required for curing a certain area of photosensitive material with different lighting powers. When the lighting power is below $P_0$, the required energy W is infinite, since t=W/P, i.e. needing an infinite time. The curve contains a linear section (a portion close to the level in the figure) and a non-linear section (a hatched portion in the figure). On the linear section, with the increasing of the lighting power, the required curing time is inversely proportional to the lighting power, and the required energy for curing is substantially unchanged; and on the non-linear section, with the decreasing of the lighting power, the required curing time is non-linearly increased rapidly, and the required energy for curing is non-linearly increased.

In summary, the photosensitive resin has the following properties:

1. curing can occur only when the power of light irradiation must reach a certain lower limit $P_0$, and if lower than this power, curing cannot be performed no matter how to prolong the exposure time, and this light power is called threshold power;

2. the above-mentioned "reciprocity law" can be substantially met only on the linear section;

3. however, in a region close to $P_0$, a minor reduction in the lighting power needs to greatly increase the exposure time, so that the resin can be cured to the same level.

Since the wavelength of lighting required for the photosensitive resin is below 430 nm, and excessively strong light rays of this wavelength may cause damage to liquid crystals in the liquid crystal panel, when a 3D printing device of the liquid crystal panel is used, a relatively low lighting intensity will be selected, for example, setting in the position slightly greater than $P_0$, so as to prolong the service life of the liquid crystal panel. However, this also means that the photosensitive resin can be cured only needing to greatly increase the exposure time, which greatly reduces the photosensitive speed.

In the embodiments of the present invention, only by scaling down the light spots and multiplying the brightness of the light spots, so that the imaging system can get rid of the necessity to greatly increase the exposure time, the non-linear section of resin curing can enter the relatively linear section, thereby greatly reducing the curing time for the photosensitive material and improving the photosensitive speed. Meanwhile, the total energy W (this is also light energy passing through the liquid crystal panel) required for curing is reduced, and the service life of the liquid crystal panel is prolonged.

In another embodiment of the present invention, the light beam images during various exposures contain different image information. By taking FIG. 10 as an example, in the projection image D, four light spots within a virtual box contain the image information different from each other. This means that the resolution of the image correspondingly becomes four times of the original resolution. Therefore, the precision of 3D printing is significantly improved.

In the above-mentioned embodiments of the present invention, by providing a focusing lens array, light beams irritated onto a liquid crystal panel are converged to penetrate the light-transmitting regions of various pixels of the liquid crystal panel to pass through the liquid crystal panel as far as possible, so that the shielding of a non-light transmitting portion of the liquid crystal panel is reduced until it is avoided. In addition, by means of the convergence of light beams, the area of light spots irritated onto a photosensitive material surface can be scaled down, and the brightness is significantly improved; and in the case where the total luminous flux of the liquid crystal panel is relatively small, a photosensitiveity threshold value of photosensitive resin can still be reached, and a photosensitive speed is improved. Moreover, the photosensitive material surface can be filled with exposed light spots by means of multiple exposures in cooperation with the micro-displacement of the deflecting lens, and the resolution of imaging can be improved by using different imaging information with regard to various exposures, so that the precision of printing is improved.

Although the present invention has been disclosed above in the preferred embodiments, it is not intended to limit the present invention, a person skilled in the art can make some modifications and improvements without departing from the spirit and scope of the present invention. Therefore, the scope of protection of the present invention should be subject to what is defined in the claims.

What is claimed is:

1. An imaging system of a photo-curing 3D printing device, the imaging system comprising:
    a light source configured to emit a light beam;
    a liquid crystal panel located on a light path of the light beam, wherein the liquid crystal panel comprises a plurality of pixels;
    a first polarized light filter disposed between the light source and the liquid crystal panel;
    a second polarized light filter, the liquid crystal panel being disposed between the first polarized light filter and the second polarized light filter;
    a focusing lens array disposed between the first polarized light filter and the liquid crystal panel, wherein each focusing lens of the focusing lens array corresponds to a respective pixel of the liquid crystal panel, and each focusing lens converges a respective portion of the light beam onto the pixel so as to transmit the portion of the light beam through a light-transmitting region of the pixel to the second polarized light filter;
    a projection lens disposed between the second polarized light filter and a photosensitive material surface, wherein the first polarized light filter and the second polarized light filter cooperate with the liquid crystal panel to shield a part of the light beam so as to form a light beam image between the second polarized light filter and the projection lens for each of a plurality of the pixels of the liquid crystal panel, and wherein the projection lens projects light forming the light beam images to form a plurality of light spots on the photosensitive material surface;
    a deflecting lens disposed between the second polarized light filter and the photosensitive material surface, wherein the deflecting lens is controllable to rotate the deflecting lens around at least one rotation axis perpendicular to an optical axis of the imaging system, so as to finely tune the position of the light spots formed on the photosensitive material surface; and
    a controller to command the light source to perform multiple exposures, the controller controlling the deflecting lens during each exposure to control the orientation of the deflecting lens relative to the light path during the exposure.

2. The imaging system of a photo-curing 3D printing device of claim 1, wherein the focusing lens array covers the liquid crystal panel.

3. The imaging system of a photo-curing 3D printing device of claim 1, wherein at least some of the light spots formed on the photosensitive material surface during the multiple exposures are substantially not overlapped with one another.

4. The imaging system of a photo-curing 3D printing device of claim 1, wherein the light spots formed on the photosensitive material surface during the multiple exposures cover the photosensitive material surface.

5. The imaging system of a photo-curing 3D printing device of claim 1, wherein the dimension of each of the respective light beam images is less than, equal to or slightly greater than half of a dimension of the respective pixel of the liquid crystal panel.

6. The imaging system of a photo-curing 3D printing device of claim 1, wherein the light beam images during various exposures contain the same image information.

7. The imaging system of a photo-curing 3D printing device of claim 1, wherein the light beam images during various exposures contain different image information.

8. The imaging system of a photo-curing 3D printing device of claim 1, wherein the ratio of the dimension of each of the light beam images to the pixel dimension of the liquid crystal panel is approximately 1:2, 1:3 or 1:4, and the number of exposures of the light source is four, nine or sixteen.

9. The imaging system of a photo-curing 3D printing device of claim 1, wherein for the distance between the light source and the focusing lens equal to L1, the distance of the focusing lens to an imaging plane equal to L2, a front focal length and a back focal length of the focusing lens respectively equal to f and f', the dimension of the light source equal to A, and the dimension of the image equal to d, the following conditions are satisfied:

$$f/L2+f/L1=1; \text{ and}$$

$$L1/L2=A/d.$$

10. The imaging system of a photo-curing 3D printing device of claim 1, wherein the wavelength of the light beam is below 430 nm.

11. An imaging system of a photo-curing 3D printing device, comprising:
    a light source configured to emit a light beam;
    a liquid crystal panel located on a light path of the light beam, wherein the liquid crystal panel comprises a plurality of pixels;
    a first polarized light filter disposed between the light source and the liquid crystal panel;
    a second polarized light filter, the liquid crystal panel being disposed between the first polarized light filter and the second polarized light filter;
    a focusing lens array disposed between the first polarized light filter and the liquid crystal panel, wherein each focusing lens of the focusing lens array corresponds to a respective pixel of the liquid crystal panel, and each focusing lens converges a respective portion of the light beam onto the pixel so as to transmit the portion of the light beam through a light-transmitting region of the pixel to the second polarized light filter;
    a projection lens disposed between the liquid crystal panel and a photosensitive material surface, wherein the first polarized light filter and the second polarized light filter cooperate with the liquid crystal panel to shield a part of the light beam so as to form a light beam image between the second polarized light filter and the projection lens for each of a plurality of the pixels of the liquid crystal panel, and wherein the projection lens projects light forming the light beam images to form a plurality of light spots on the photosensitive material surface;
    a micro-displacement drive mechanism connected to the liquid crystal panel and operable to move the liquid crystal panel, transverse to the light path, in a first direction and a second direction perpendicular to the first direction, so as to finely tune the position of the light spots formed on the photosensitive material surface; and
    a controller to command the light source to perform multiple exposures, the controller controlling the micro-displacement drive mechanism during each exposure to control the position of the liquid crystal panel transvers to the light path during the exposures.

12. A photo-curing 3D printing device, comprising:
a material tank configured to accommodate a photosensitive resin;
a light source configured to emit a light beam;
a liquid crystal panel located on a light path of the light beam, wherein the liquid crystal panel comprises a plurality of pixels;
a first polarized light filter disposed between the light source and the liquid crystal panel;
a second polarized light filter, the liquid crystal panel being disposed between the first polarized light filter and the second polarized light filter;
a focusing lens array disposed between the first polarized light filter and the liquid crystal panel, wherein each focusing lens of the focusing lens array corresponds to a respective pixel of the liquid crystal panel, and each focusing lens converges a respective portion of the light beam onto the pixel so as to transmit the portion of the light beam through a light-transmitting region of the pixel to the second polarized light filter;
a projection lens disposed between the second polarized light filter and a photosensitive material surface, wherein the first polarized light filter and the second polarized light filter cooperate with the liquid crystal panel to shield a part of the light beam so as to form a light beam image between the second polarized light filter and the projection lens for each of a plurality of the pixels of the liquid crystal panel, and wherein the projection lens projects light forming the light beam images to form a plurality of light spots on the photosensitive material surface;
a deflecting lens disposed between the second polarized light filter and the photosensitive material surface, wherein the deflecting lens is controllable to rotate the deflecting lens around at least one rotation axis perpendicular to an optical axis of the imaging system, so as to finely tune the position of the light spots formed on the photosensitive material surface; and
a controller to command the light source to perform multiple exposures, the controller controlling the deflecting lens during each exposure to control the orientation of the deflecting lens relative to the light path during the exposure.

* * * * *